United States Patent Office 3,766,239
Patented Oct. 16, 1973

3,766,239
AMMOXIDATION OF CHLOROMETHYL COMPOUNDS
Yves Colleuille and Robert Perron, Lyon, France, assignors to Rhone-Poulenc S.A., Paris, France
No Drawing. Filed Dec. 23, 1970, Ser. No. 101,182
Claims priority, application France, Dec. 30, 1969, 45,468; Oct. 30, 1970, 39,201
Int. Cl. C07c *121/02*
U.S. Cl. 260—465 R    9 Claims

ABSTRACT OF THE DISCLOSURE

Nitriles of formula YCN where Y is alkylphenyl or alkenyl of formula

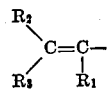

where $R_1$, $R_2$ and $R_3$ are hydrogen or alkyl, at least one being methyl, are obtained by vapour phase ammoxidation using oxygen and ammonia in the presence, as catalyst, of at least one element of Groups I–B, III–A, III–B, IV–A, IV–B, V–A, V–B or VI–B of the Periodic Table or of iron or of at least one derivative thereof.

---

The present invention relates to a process for preparing nitriles by the action, in the vapour phase, of oxygen and ammonia on chloromethylated compounds.

It is already known to convert certain chloromethylated compounds into nitriles by the action of a gaseous mixture containing oxygen and ammonia. This treatment by oxygen and ammonia, called ammoxidation, allows, for example, allyl chloride to be converted into acrylonitrile at a temperature of between 360 and 400° C. (see Russian patent specification No. 143,394). It is also known that at such temperatures either a methyl radical attached to an ethylenic carbon atom or an alkyl radical on an alkylaryl derivative can be converted by this treatment into a nitrile radical; see for example French patent specification No. 1,222,460 which describes the conversion of propylene to acrylonitrile and U.S. patent specification No. 2,499,055 which describes the conversion of toluene and isopropyl benzene.

The ammoxidation of a compound having chloromethylated radicals as well as other ammoxidisable radicals, for example a methyl radical attached to an ethylenic carbon atom, leads, in general, to a mixture of compounds resulting from partial or complete conversion of the chloromethyl and/or methyl groups.

The present invention provides a process for the production of a nitrile of general formula Y—CN wherein Y represents an alkylphenyl radical or an alkenyl radical of general formula:

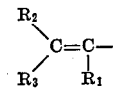

$R_1$, $R_2$ and $R_3$ representing hydrogen atoms or alkyl radicals, at least one of them representing a methyl radical, which comprises treating a compound of general formula YCH$_2$Cl, with oxygen and ammonia in the vapour phase, in the presence of at least one element of Groups I–B, III–A, III–B, IV–A, IV–B, V–A, V–B or VI–B, of the Periodic Classification of the Elements, or of iron or of at least one derivative thereof.

Reference may be made to the Bulletin de la Societe Chimique de France, January 1966, for the Periodic Classification of the Elements.

This ammoxidation process allows the chloromethylated radicals in the molecules Y—CH$_2$Cl to be converted, in a selective manner, into —CN radicals, whilst leaving the constituents of the radical Y substantially unaltered.

In the chloromethylated products of formula YCH$_2$Cl, the various alkyl radicals, which may be straight chained or branched, may have 1 to 6 carbon atoms. The alkylphenyl radicals can have one, two or three alkyl radicals.

Compounds of formula YCH$_2$Cl, which may be ammoxidised in accordance with the present invention include methallyl chloride, 4-chlorobutene-2, 2-methyl-4-chloro-butene-2, 3-methyl - 4 - chloro-butene-2, 4-methyl-5-chloro-pentene-3, 4-methyl-5-ethyl - 6 - chloro-hexene-4, o-, m- and p-chloromethyltoluene, m- and p-chloromethylcumene, 3,5-dimethylchloromethylbenzene and 2-methyl-4-butylchloromethylbenzene.

The metal or metalloid derivatives used in the process of the invention and which serve to catalyse the desired reaction can be free metals, activated if necessary, metal or metalloid oxides, or mixtures of these oxides in which a part of the oxide can be combined in the form of acid salts or of inorganic heteropolyacids. Metal oxides which may be used include those of copper, iron, tin, lead, titanium, zirconium, vanadium or thallium. Metalloid oxides which may be used include those of boron, phosphorus, silicon and germanium. Examples of metal derivatives where the oxide is combined as a salt where the metal is present in the anion are the stannates and zirconates of lead or thallium. The oxides can be deposited on an inert support or on a support with which they can be partly combined in the form of salts of inorganic acids. The catalysts mentioned have for example been described in general articles devoted to the ammoxidation reaction (see Russian Chemical Reviews 34 (9) 657 (1965); Chemisches Technik 20 (10) 600–9 (1963)).

Detailed working methods for preparing these catalysts are disclosed in French patent specification Nos. 1,161,-138, 1,171,975, 1,333,040, 1,365,889, and British patent specification No. 904,602 and reference may be made to these documents for a further description of catalysts which may be used in the present invention.

The temperature of ammoxidation of the chloromethylated compounds YCH$_2$Cl can vary between 300 and 600° C., and preferably between 350 and 450° C. In general, a fixed catalyst bed is used.

Theoretically, two molecules of ammonia and one molecule of oxygen are required per chloromethyl radical which is to be ammoxidised. In practice, an excess over theoretical of ammonia and an excess over theoretical of oxygen is used. Amounts of ammonia and oxygen at least equal to 10 times the theoretical amount are usually employed. However, on account of the possibility of auto-ignition of such mixtures, the oxygen is preferably diluted with an inert gas. Water vapour or nitrogen for example, can be used as the diluent. In this latter case, it is simplest to use air; the reaction is then carried out in the presence of an excess of air which may contain 12 to 15 times the theoretical amount of oxygen required. In general, the rate of flow of the reactants is such that the duration of contact with the catalyst is from 0.5 to 8 seconds, and preferably from 1 to 3 seconds. The products leaving the apparatus are then cooled very quickly to avoid secondary reactions. It is very often found that the reaction mixture contains, in addition to be expected nitrile, a small amount of the corresponding aldehyde. The resulting nitriles can be isolated by any known method, for example by fractional distillation and any aldehyde present can be separated as the bisulphite addition compound.

EXAMPLE 1

10 cm.³ of a catalyst which was prepared as described in French patent specification No. 1,161,138, by impregnating an alumina having a specific surface area of less than 5 m.²/g. with a solution of vanadyl oxalate of such a concentration that after drying and calcination the percentage of vanadium oxide deposited reaches 5%, is charged into a tubular reactor having an internal diameter of 1 cm. A mixture of air, o-chloromethyltoluene, water vapour and ammonia in volume ratio of 78:1:1:3, is passed over the catalyst bed heated to 425° and at a rate of 3.6 l./h. (volumes measured under standard temperature and pressure conditions). The substances issuing from the reactor are recovered by bubbling them through a trap containing 200 cm.³ of chloroform cooled to −20°. After a reaction time of 10 hours, the chloroform solution is analysed by chromatography. The conversion yield of o-chloromethyltoluene is 100%, and the yields of o-tolunitrile and o-methylbenzaldehyde determined are respectively 49% and 14%. The chloroform is removed from the solution by distillation and the residual mixture is treated with a bisulphite solution prepared by adding 20 cm.³ of ethanol to 100 cm.³ of a 36% strength aqueous sodium bisulphite solution, allowing the mixture to stand overnight and filtering off the sodium bisulphite which has settled. The addition of the bisulphite solution to the reaction mixture causes the formation of a copious precipitate which is filtered off and washed with ether. The filtrate is then decanted and the resulting organic layer is distilled. 9 g. of o-tolunitrile are obtained (Eb$_{20}$:94–95°).

EXAMPLE 2

500 mg. of the catalyst of the preceding example are charged into a 0.5 cm.³ volume reactor, and a gas stream of 0.9 l./h. (measured at 0° and under 760 mm. of mercury), comprising air, methallyl chloride and ammonia (volumetric ratios 9:1:3), is introduced into the catalyst bed heated to 400°. The substances leaving the reaction are analysed by gas phase chromatography. The conversion yield of the methallyl chloride is 93% and the yields of methacrylonitrile and methacrolein are respectively 48 and 11% relative to the methallyl chloride introduced.

EXAMPLE 3

The procedure of Example 2, is repeated but at a temperature of 450°. The conversion yield of the methallyl chloride is 100% and the yields of the corresponding nitrile and aldehyde are, respectively, 60% and 13% relative to the methallyl chloride introduced.

EXAMPLE 4

The procedure of Example 1 is repeated but using as catalyst 500 mg. of a catalyst based on iron oxide and antimony oxide prepared as described in French patent specification No. 1,333,040, and decreasing the temperature of the reactor to 375°. The conversion yield of the methallyl chloride is 89% and that the yields of nitrile and aldehyde are, respectively, 44% and 16% relative to the methallyl chloride introduced.

We claim:
1. Process for the production of a nitrile of general formula Y—CN where Y represents a phenyl radical substituted by 1, 2 or 3 alkyl radicals each having 1 to 6 carbon atoms, or wherein Y represents an alkenyl radical of general formula

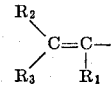

$R_1$, $R_2$ and $R_3$ representing hydrogen atoms or lower alkyl radicals, at least one of $R_1$, $R_2$ and $R_3$ representing a methyl radical, which comprises treating a compound of general formula YCH$_2$Cl with oxygen and ammonia in the vapour phase in the presence of a catalyst consisting essentially of at least one oxide selected from oxides of vanadium, oxides of iron and oxides of antimony.

2. Process according to claim 1 wherein a mixture of air, ammonia and the compound YCH$_2$Cl is passed over a fixed bed of the catalyst at 350–450° C.

3. Process according to claim 1 wherein the amount of oxygen and ammonia are each at least 10 times the amount theoretically required to convert each —CH$_2$Cl group.

4. Process according to claim 1 wherein a gaseous inert diluent is present.

5. Process according to claim 1 wherein a mixture of air, o-chloromethyltoluene, water vapour and ammonia is passed through a fixed bed of a catalyst consisting essentially of aluminium oxide containing 5% by weight vanadium oxide at about 425° C. to give o-tolunitrile.

6. Process according to claim 5 wherein the reaction product is brought into contact with a sodium bisulphite solution and the desired o-tolunitrile separated from the precipitated o - methyl-benzaldehyde/bisulphite addition compound.

7. Process according to claim 1 wherein a mixture of air, methallyl chloride and ammonia is passed through a fixed bed of a catalyst consisting essentially of aluminium oxide containing 5% by weight vanadium oxide at about 400–450° C. to give methacrylonitrile.

8. Process according to claim 7 wherein the reaction product is brought into contact with a sodium bisulphite solution and the desired methacrylonitrile separated from the precipitated methacrolein/bisulphite addition compound.

9. A process according to claim 1 wherein the oxide is supported on a catalyst support.

References Cited
UNITED STATES PATENTS
3,365,482   1/1968   Khoobiar _____ 260—465.3

JOSEPH P. BRUST, Primary Examiner

U.S. Cl. X.R.

260—465 R, 465.9, 599, 601 R